(12) United States Patent
Cengil (10) Patent No.: US 9,964,413 B2
(45) Date of Patent: May 8, 2018

(54) NAVIGATION DEVICE FOR A MOVABLE OBJECT AND METHOD FOR GENERATING A DISPLAY SIGNAL FOR A NAVIGATION DEVICE FOR A MOVABLE OBJECT

(71) Applicant: VOLKSWAGEN AG, Wolfsburg (DE)

(72) Inventor: Sükrü Cengil, Burgwedel (DE)

(73) Assignee: VOLKSWAGEN AG, Wolfsburg (DE)

( * ) Notice: Subject to any disclaimer, the term of this patent is extended or adjusted under 35 U.S.C. 154(b) by 33 days.

(21) Appl. No.: 14/760,352

(22) PCT Filed: Jan. 7, 2014

(86) PCT No.: PCT/EP2014/050125
§ 371 (c)(1),
(2) Date: Jul. 10, 2015

(87) PCT Pub. No.: WO2014/108387
PCT Pub. Date: Jul. 17, 2014

(65) Prior Publication Data
US 2015/0354979 A1 Dec. 10, 2015

(30) Foreign Application Priority Data
Jan. 10, 2013 (DE) .......................... 10 2013 000 879

(51) Int. Cl.
*G01C 21/36* (2006.01)

(52) U.S. Cl.
CPC ..... *G01C 21/3638* (2013.01); *G01C 21/3682* (2013.01); *G01C 21/3685* (2013.01)

(58) Field of Classification Search
None
See application file for complete search history.

(56) References Cited

U.S. PATENT DOCUMENTS 6,710,774 B1   3/2004  Kawasaki et al.
8,253,736 B2   8/2012  Adabala et al.
(Continued)

FOREIGN PATENT DOCUMENTS

DE   100 23 160   11/2000
DE   697 29 684   7/2005
(Continued)

OTHER PUBLICATIONS

International Search Report, dated Oct. 15, 2014, issued in corresponding International Application No. PCT/EP2014/050125.
(Continued)

*Primary Examiner* — Mussa A Shaawat
*Assistant Examiner* — Kyung J Kim
(74) *Attorney, Agent, or Firm* — Andrews Kurth Kenyon LLP (57) ABSTRACT

A navigation device for a movable object includes a data provider and a processor that provides a three-dimensional navigation map having towering map objects. Based on an ascertained position of a movable object, the processor receives a three-dimensional navigation map having towering map objects of an area surrounding the movable object and provides navigation map to a display device so that the navigation map is reproducible by the display device in a manner viewed from a view position which is located above the navigation map and is a function of the ascertained position of the movable object. The processor dynamically alters a height of a towering map object in the navigation map as a function of a distance of the towering map object to the view position.

17 Claims, 6 Drawing Sheets

(56) References Cited

U.S. PATENT DOCUMENTS

| | | | |
|---|---|---|---|
| 2001/0026276 A1* | 10/2001 | Sakamoto | G01C 21/3638 |
| | | | 345/473 |
| 2009/0109216 A1* | 4/2009 | Uetabira | G06T 17/05 |
| | | | 345/419 |
| 2011/0043519 A1 | 2/2011 | Seo et al. | |
| 2012/0123678 A1 | 5/2012 | Poppen et al. | |

FOREIGN PATENT DOCUMENTS

| | | |
|---|---|---|
| DE | 10 2006 059 922 | 6/2008 |
| EP | 0 897 170 | 2/1999 |
| EP | 1 024 467 | 8/2000 |
| JP | 2003-166836 | 6/2003 |
| WO | 2007/126199 | 11/2007 |

OTHER PUBLICATIONS

Written Opinion, dated Oct. 15, 2014, issued in corresponding International Application No. PCT/EP2014/050125.

International Preliminary Report on Patentability, dated Jul. 23, 2015, issued in corresponding International Application No. PCT/EP2014/050125.

\* cited by examiner

NAVIGATION DEVICE FOR A MOVABLE OBJECT AND METHOD FOR GENERATING A DISPLAY SIGNAL FOR A NAVIGATION DEVICE FOR A MOVABLE OBJECT

CROSS REFERENCE TO RELATED APPLICATIONS

The present application claims priority to Application No. 10 2013 000 879.4, filed in the Federal Republic of Germany on Jan. 10, 2013, which is expressly incorporated herein in its entirety by reference thereto.

FIELD OF THE INVENTION

The present invention lies in the field of navigation systems and relates especially to a navigation device for a movable object and a method for generating a display signal for a navigation device for a movable object.

BACKGROUND INFORMATION

A multitude of navigation systems exist for the display of travel routes or flight routes. For example, such navigation systems include an indicating device in the form of a display on which a section of a geographical map or road map based on digital geodata or topographical data is able to be displayed. Usually, the display shows basically the course of the roads and routes within the map section displayed, as well as features of the surroundings such as outlines of adjacent buildings, neighborhoods or wooded areas. Traditionally, three-dimensional geodata is able to be displayed two-dimensionally by navigation systems.

However, it is often the case that in certain display modes such as 3-D-display, for example, a preview of the route guidance around a block of buildings or whole areas is not good or is not given at all because of the perspective and the height of the buildings. For the most part, such representations are only very rudimentary. To that end, some systems offer a type of transparency mode, so that one is able to see through the buildings. However, this is accompanied by a few disadvantages such as the superimposition of too many building surfaces, which in turn may be confusing. Thus, at the moment, the information necessary for the navigation or route guidance cannot be shown in sufficient detail on the usually limited display area of a navigation system. Therefore, only insufficient information is offered with regard to the navigation or route guidance, which means usage safety and usage reliability also decline, since the user cannot recognize until very late, the direction the further route takes to his destination, or the user must view the display area for a long time in order to orient himself, and may thus be distracted from traffic.

Therefore, the need exists to provide a navigation device for a movable object, which permits an increase in usage safety, usage reliability and/or the density of the information required.

SUMMARY

Exemplary embodiments relate to a navigation device for a movable object having a data provider and a processor. The data provider is designed to provide data of a three-dimensional navigation map having towering map objects. Moreover, the processor is designed, based on an ascertained position of a movable object, to receive data of a three-dimensional navigation map having towering map objects of an area surrounding the movable object from the data provider, and to make a display signal representing the navigation map available for a display device for reproduction of the navigation map. In addition, the processor is designed to generate the display signal so that the navigation map is reproducible by the display device in a manner viewed from a view position that is located above the navigation map and is a function of the ascertained position of the movable object. Furthermore, the processor is designed to dynamically alter a height of a towering map object in the navigation map as a function of a distance of the towering map object to the view position.

By the dynamic alteration of the heights of towering map objects in the navigation map, areas of the navigation map further away from the view position may be displayed in a manner easily understandable for the user. In this way, for example, a route guidance on the navigation map (thus, the route drawn in to the desired destination) may be displayed visibly for the user, even if the route leads around high buildings or unevenness in the terrain which would conceal the route to the destination without the alteration of the height (e.g., reduction of the height). The density of the information needed by the user, which is able to be represented by a display device based on the display signal, may thereby be increased considerably. Moreover, for example, usage safety and/or usage reliability of the navigation device may be increased, since a user is able to recognize early on, in what direction the route to his destination leads In exemplary embodiments, the processor alters the height of the towering map object by multiplying at least one height parameter of the towering map object received from the data provider or calculated by the processor, by a scaling factor which is a function of the distance of the towering map object to the view position, or by a calculation corresponding to such a multiplication, based on at least one scaling factor. In this manner, the height of map objects may be altered as a function of distance, with little computing expenditure.

Exemplary embodiments relate to a processor that reduces a height of a first towering map object at a first distance from the view position more sharply than a height of a second towering object at a second distance from the view position, the first distance being smaller than the second distance. For example, closer map objects may thus be reduced more in their height than those further away, so that towering map objects conceal fewer and fewer parts of the navigation map, the nearer the towering map objects are to the view position. On one hand, a three-dimensional representation may thereby be made possible at greater distance, and on the other hand, close sections having high density of needed or desired information may be made available for the user (e.g., especially for the route guidance), since no or only slight covering of such information by towering map objects is able to occur.

Exemplary embodiments relate to a vehicle having a navigation device according to the concept previously described.

BRIEF DESCRIPTION OF THE DRAWINGS

In the following, exemplary embodiments are explained in greater detail with reference to the accompanying figures.

In the following description of the accompanying figures, which show exemplary embodiments, identical reference numerals designate identical or comparable components. In addition, combining reference numerals are used for components and objects which appear repeatedly in an exemplary embodiment or in a drawing, but are described together with regard to one or more features. Components or objects which are described with the same or combining reference numerals may be implemented identically in terms of individual, several or all features, e.g., their dimensions, but if appropriate, may also be realized differently, provided nothing to the contrary follows explicitly or implicitly from the description.

DETAILED DESCRIPTION

Figure 1:
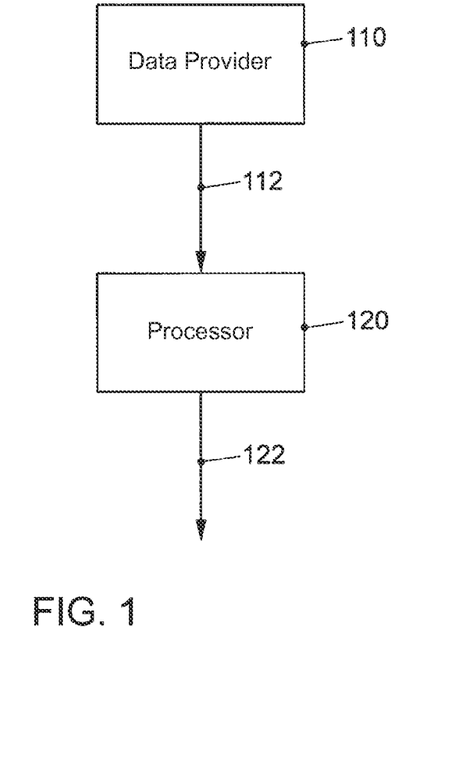
FIG. 1 shows a block diagram of a navigation device for a movable object.

FIG. 1 shows a block diagram of a navigation device 100 for a movable object according to one exemplary embodiment. Navigation device 100 includes a data provider 110, which is connected to a processor 120. Data provider 110 provides data 112 of a three-dimensional navigation map having towering map objects. Based on an ascertained position of a movable object, processor 120 receives data 112 of a three-dimensional navigation map having towering map objects of an area surrounding the movable object from data provider 110, and makes a display signal 122 representing the navigation map available for a display device for reproducing the navigation map. Moreover, processor 120 generates display signal 122 so that the navigation map is reproducible by the display device in a manner viewed from a view position that is located above the navigation map and is a function of the ascertained position of the movable object. In addition, processor 120 dynamically alters (e.g., reduces) a height of a towering map object in the navigation map as a function of a distance of the towering map object to the view position.

By changing the height of towering map objects as a function of a distance of the towering object to the view position, which may also be referred to as distance-based height adjustment, information (e.g., about the route guidance) is able to be made available to a user, which could not or could only be provided more poorly in a display if the height of towering map objects were not altered. Especially in the case of three-dimensional navigation maps which feature buildings or unevenness in the terrain, for example, the concept described also permits areas to be shown which otherwise would be concealed by the buildings or terrain irregularities. Since the display area of navigation systems is normally quite small in comparison to computer screens or television sets, for example, an increase in the density of needed or desired information on the display area is extremely helpful for the user. In this manner, in the case of a route guidance, for instance, the driver of a vehicle as user of navigation device 100 may be permitted to have a better overall view of the route yet to be covered (and especially the closer section of the route yet to be covered), and thus to be warned earlier about dangerous places or exceptional features on the route or to be able to make necessary lane changes for turning off in a more foresighted manner (e.g., even if a voice guidance is scarcely possible because of children's noise in the car or other background noises). Usage safety and/or usage reliability may thereby be increased considerably, since the user is able more quickly to get an overview of the surroundings and/or a route guidance, and has to make no or few adjustments in order to obtain the necessary information.

The movable object may be different depending on the field of application of navigation device 100. Thus, for instance, a movable object may be a pedestrian, a bike rider or a vehicle (e.g., motorcycle, passenger car, truck, ship or airplane). Correspondingly, the user of navigation device 100 may be a pedestrian, a cyclist or the driver of a vehicle, for example. Navigation device 100 may be a portable or a permanently installed system.

Data provider 110 provides data 112 of a three-dimensional navigation map. In this context, for instance, data provider 110 may be a memory unit (e.g., hard disk, memory card, internal memory, or a CD drive or DVD drive) or an interface of navigation device 100 for connection to an internal or external memory unit. The navigation map may be provided by data 112, which represent the navigation map (e.g., three-dimensional coordinates of points or objects of the navigation map). In this context, for instance, data 112 may be provided by suitable signals depending on the communications protocol selected. For example, data provider 110 may also be a wireless interface for receiving data from the Internet, so that data 112 of the navigation map may be supplied via the Internet, as well.

The navigation map to be represented may be a section of a geographical map or road map, for instance, based on digital geodata or topographical data. For example, a course of streets and routes within the map section displayed as well as features of the surrounding area such as outlines of adjacent buildings (as example for a towering map object), neighborhoods or wooded areas may be represented. Furthermore, a route guidance, thus, a marking or highlighting of a route to a desired destination, may be overlaid.

For example, a three-dimensional navigation map has position information of points or objects of the navigation map relative to each other in all three spatial directions of a coordinate system (e.g., with origin at the position of the movable object or with origin at the view position or any other predefined point). The navigation map usually has a considerably greater extension in its length and width than in its height. For example, streets and roads of the navigation map may lie in one plane (e.g., be situated in a reference plane), and objects (e.g., buildings) may rise out of this plane. A height of a towering map object may relate, for instance, to a distance in the vertical direction from a plane of a street on which the movable object is located, or from a reference plane.

For example, the view position is a point from which the navigation map is viewed. The view position is located, e.g., at a defined distance above the navigation map or at a defined coordinate in a three-dimensional reference system to which the location of the points in the navigation map also relate. The position or location of the view position in relation to the navigation map may change, for instance, according to a movement of the movable object relative to the navigation map. For instance, a location of the view position (e.g., in the form of three-dimensional coordinates) is able to be determined at any time or is known, e.g., at any time, regardless of such a movement. The perspective from which the navigation map is viewed (e.g., aerial perspective above the ascertained position of the movable object) is determined, for example, by the view position.

For example, the entire navigation map to be represented by the output device having the distance-based, height-altered map objects is reproducible by the display device in a manner viewed from the view position.

A towering map object may be a building, for example, an irregularity in the terrain (e.g., a mountain) or other object of the navigation map which rises above the level (e.g., a road) on which the movable object is located. In this context, for instance, anything which is located above the level of the movable object, or only map objects which have a height of more than a predefined (minimum) height may be regarded as a towering object.

For example, a height of a map object may relate to a height above street level or above a reference plane to which the vertical coordinates of map objects or points on the navigation map relate.

Processor 120 receives from data provider 110, data 112 of a three-dimensional navigation map of an area surrounding the movable object based on an ascertained position of the movable object. The position of the movable object may be ascertained by a position determiner such as a GPS system (Global Positioning System), for instance, or another localization system, and made available either to data provider 110 (which then supplies the corresponding map data to the processor) or to processor 120 (which then requests corresponding map data at the data provider). In this context, the position determiner may be part of navigation device 100 (e.g., in the case of a portable navigation system for pedestrians or bikers or perhaps in vehicles) or an external component (e.g., in the case of vehicles or remote-controlled objects). Data 112 of the navigation map includes information about the vicinity of the movable object (e.g., map section which shows the surroundings within a predefined perimeter around the view position), so that the user is able to recognize how he or the movable object can move in order to reach a desired destination.

Processor 120 generates a display signal 122 representing the navigation map and makes it available for a reproduction of the navigation map by a display device. Such a display signal 122 may be a video signal or a control signal, for example. Display signal 122 may be provided in a format that is able to be processed by the respective display device for the reproduction of information (e.g., in the form of images).

Optionally, the display device may be part of navigation device 100 (e.g., in the case of portable navigation systems) or an external component to which navigation device 100 may be connected.

Processor 120 dynamically alters a height of a towering map object as a function of a distance of the towering object to the view position. For example, the height of a towering map object (e.g., a building) may be a maximum extension of the map object in the vertical direction (e.g., the height coordinate of the highest point of the map object in the reference coordinate system of the navigation map), the vertical distance of a geometric centroid of the map object from a reference height, or another value characterizing the towering map object in its vertical extension. The height of a building may be defined by the distance between street level (or height level of the movable object) and the highest point of the building, for instance, or may simply be the height coordinate of the highest point of the building (which, for example, leads to the same result, if the reference coordinate system for the vertical coordinate has the zero point at street level).

Processor 120 may determine the distance between the view position and the towering map object for the distance-dependent or distance-based height alteration or height adjustment of the map object. For example, this distance may be a distance between the view position and a reference point of the towering object such as the geometric centroid, the highest point, the point closest to the view position or another point uniquely assignable to the towering map object. For instance, this reference point of the towering map object may already be supplied with the navigation map by data provider 110 or be determined by processor 120.

Processor 120 may dynamically alter the height of the towering map object as a function of distance. Due to this dynamic change, processor 120 is also able to take a movement of the movable object into account. The distance between the towering map object and the view position (which moves, e.g., corresponding to the movable object) may change owing to a movement of the movable object. For instance, processor 120 may reduce the height of the towering map object more and more sharply when the view position moves toward the towering map object, thus, the distance of the towering object to the view position becomes smaller.

Processor 120 is able to change the height of a towering map object in various ways. For example, processor 120 is able to alter the height of the towering map object by reducing (or perhaps also increasing) the height of the towering map object (in comparison to an unchanged height of the towering map object). In particular, processor 120 may dynamically reduce the height of a towering map object as a function of the distance of the towering map object to the view position.

In general, a map object which is closer to the view position (thus, has a smaller distance) may be reduced more sharply in its height, for instance, than a map object that is further away from the view position (thus, has a greater distance). This greater reduction in height may relate to an absolute value; in particular, however, the reduction in height may relate as a percentage to the original height, so that a map object is reduced more sharply by a smaller scaling factor, for example. In other words, processor 120 may reduce a height of a first towering map object at a first distance from the view position more than a height of a second towering object at a second distance from the view position, if the first distance is less than the second distance. In this manner, precisely those map objects which, owing to their proximity to the view position, conceal a great deal of the remaining navigation map, may be reduced more than map objects further away, which conceal less of the remaining navigation map in any case.

For example, processor 120 may downsize the towering map object by a distance-dependent factor. In other words, processor 120 may alter the height of the towering map object, for instance, by multiplying at least one height parameter (e.g., geometric centroid or highest point) of the towering map object obtained from the data provider or calculated by the processor, by a scaling factor which is a function of the distance of the towering map object to the view position. In this manner, a distance-based height adjustment of towering map objects may be realized with little computing expenditure.

A reduction in the height of a map object corresponding to a scaling factor may be seen in terms of the original height of a map object. For example, a scaling factor of 0.5 can mean that the map object is reduced to 50 percent of its height, a scaling factor of 0, that the map object is reduced in its height to 0 (thus, is displayed two-dimensionally), or a scaling factor of 1, that the map object retains its original height. Owing to the relative height change based on a scaling factor, a height difference between different map objects may be retained proportionally.

By the selection and determination of distance-dependent scaling factors, it is possible to determine how greatly, from what distance and/or up to what distance the height of towering map objects is to be changed. For instance, different scaling factors may be determined for different distances to the view position. Between adjacent scaling factors (scaling factors with respect to distances between which no further scaling factor is defined), interpolation may be carried out, for example. Thus, for instance, it may be sufficient to determine a scaling factor for a maximum distance, up to which the height of towering map objects is be altered, and/or a smallest distance (which may also be 0) starting from which the height of towering map objects is to be changed. However, more than two scaling factors may also be defined at different distances, in order to realize a desired distance-dependent scaling factor.

For example, processor 120 may alter a height of a towering map object at a predefined first distance (e.g., 0 or the distance between the view position and the nearest point of the navigation map, the projection of the view position in the vertical direction onto the navigation map or to the ascertained position of the movable object) from the view position based on a first scaling factor (e.g., 0, 0.1, 0.2 or between 0 and 0.1), and alter a height of a towering map object at a predefined second distance (e.g., maximum distance at which the height is to be changed or nearest interpolation node for the definition of a scaling profile) from the view position based on a second scaling factor (e.g., 1, 0.9 or a value between 0.2 and 1.0), and alter a height of a towering object having a distance, lying between the predefined first distance and the predefined second distance, from the view position based on a scaling factor calculable by an interpolation between the first and the second scaling factor. For instance, the interpolated scaling factor may be calculated by processor 120, or data provider 110 or a separate memory unit (e.g., as look-up table) may have stored a multitude of scaling factors for different distances that are calculable by such an interpolation and, for example, provide the one of these stored interpolated scaling factors, which is stored with respect to a distance that is closest to that distance between the map object and the view position. Thus, with negligible computing expenditure, a soft characteristic may be implemented between unaltered towering map objects and the map objects altered the most.

Figure 2:
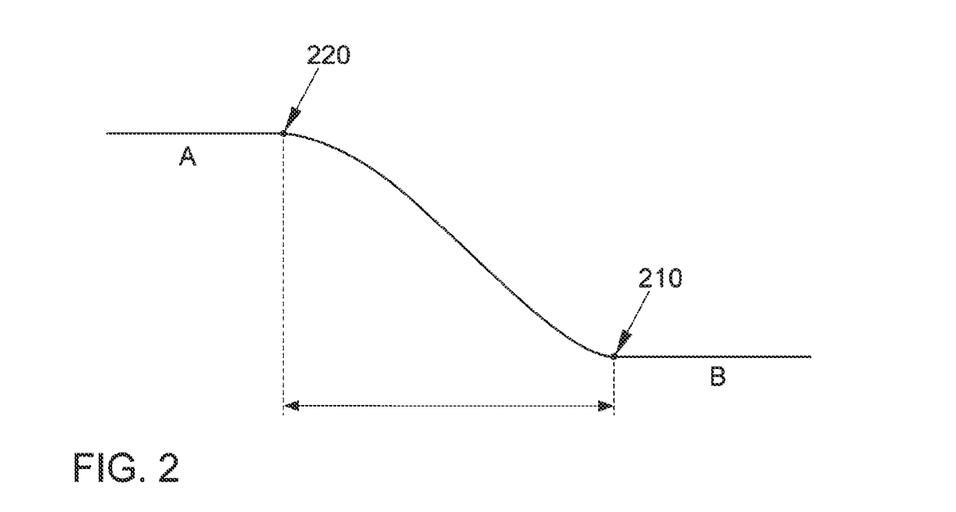
FIG. 2 shows a schematic representation of a possible tangential interpolation.

The interpolation may be carried out according to any interpolation method. An example for a tangential interpolation is shown in FIG. 2. In that case, between first scaling factor B, which is assigned to a predefined first distance 210, and a second scaling factor A, which is assigned to a predefined second distance 220, interpolation is carried out in such a way that a continuously differentiable characteristic of the interpolated scaling factors may exist between constant scaling factors A and B. For first distance 210 and second distance 220, a tangential (horizontal) run-up and runout is obtained, therefore, a soft shape of the scaling profile is provided. Thus, an automatic interpolation may take place between first scaling factor B and second scaling factor A.

Figure 3:
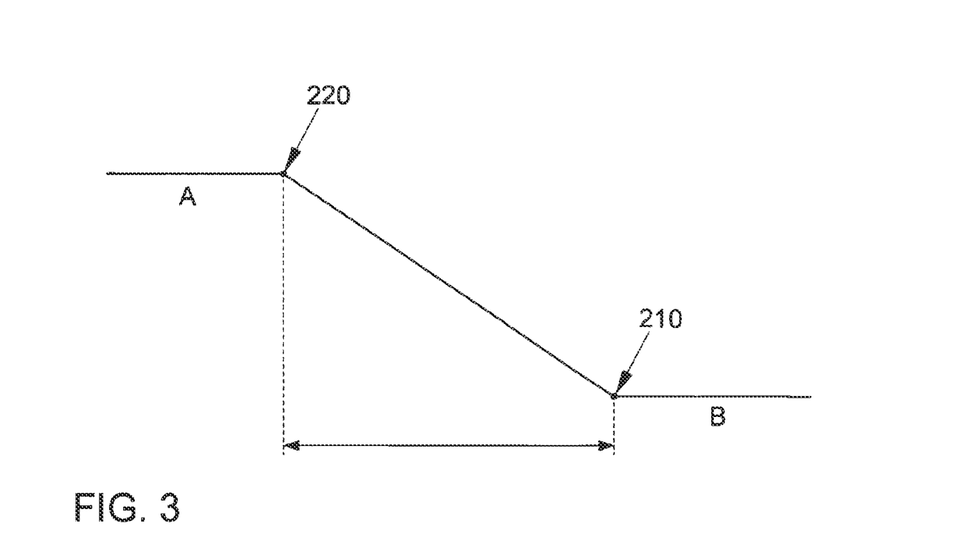
FIG. 3 shows a schematic representation of a possible linear interpolation.

Alternatively, a linear interpolation may be carried out between first scaling factor B and second scaling factor A, for example, as shown in FIG. 3. Given constant further scaling of buildings that are further away (with distances greater than second distance 220) with second scaling value A and a further scaling of map objects closer than first distance 210 with first scaling value B, in the case of a linear run-up with respect to second distance 220 and a linear runout with respect to first distance 210, this leads to a hard transition (or a harder transition than in the case of the tangential interpolation). Interpolation may again be carried out automatically in the area between first distance 210 and second distance 220.

In other words, the interpolated scaling factor may be realized by a linear interpolation between the first and the second scaling factor or by a tangential interpolation between the first and the second scaling factor, the tangential interpolation having a continuously differentiable characteristic. Due to the possibility of realizing different types of interpolation, a desired scaling profile may be realized very easily and flexibly. The discernibility of needed or desired information may thereby be improved.

The tangential run-up and runout of the tangential interpolation curve (characteristic) may be used for the purpose that the map objects (e.g., buildings) are scaled down softly at the beginning and shortly before the runout, are softly slowed down, so that the movement may look dynamic and flowing. The linear run-up and runout of the linear interpolation curve may be used so that the map objects (e.g., buildings) may be interpolated from beginning to end without soft run-up and runout.

The interpolation may be selectively changeable from tangential to linear or to another type of interpolation, e.g., as a function of the type of map objects (e.g., building). For example, the selection of a type of interpolation or a switchover between different types of interpolation may be carried out depending on a nature of the map section intended to be reproduced as the navigation map. In other words, processor 120 may use different types of interpolation, e.g., as a function of a user setting or depending on a nature of the navigation map to be reproduced. In this manner, for instance, the visualization of needed or desired information may be further improved for different types of terrain (e.g., city or country).

The change in height of a towering map object by a scaling factor may be represented in various ways. For example, either the entire towering map object may be decreased in its vertical direction, so that the entire map object can still be seen, but is distorted in the vertical direction (e.g., map object remains unchanged in its length and width), or the map object may be shifted into the ground by a value corresponding to the scaling factor, which can leave the part projecting above the ground undistorted and may be realized with negligible computing expenditure, but may lead to an odd representation, since the lower part of the map object is shifted into the ground and is no longer visible. For instance, a map object may be shifted into the ground by cutting off the part that thereupon disappears in the ground and is no longer present, or is still present but is no longer visible, since the ground conceals the lower part of the building. In other words, processor 120 may generate display signal 122 in such a way that the towering map object is reproducible by the display device in a manner scaled in the vertical direction corresponding to the change in its height, or shifted at least partially into the ground compared to parts of the navigation map adjacent to the towering map object.

As already mentioned, optionally, one or more further interpolation nodes of the scaling profile may also be defined. Thus, for example, a third scaling factor may be defined at a predefined third distance, so that an interpolation may be carried out between the second and third scaling factor according to the same or a different interpolation method, as between the first and second scaling factor. In other words, processor 120 is able to alter a height of a towering map object at a predefined third distance from the view position based on a third scaling factor, and is able to alter a height of a towering object with a distance, lying between the predefined second distance and the predefined third distance, from the view position based on a scaling factor calculable by an interpolation between the second and third scaling factor. The statements made previously concerning the first and second scaling factor, as well as possible interpolation methods supplementally pertain.

Figure 4:
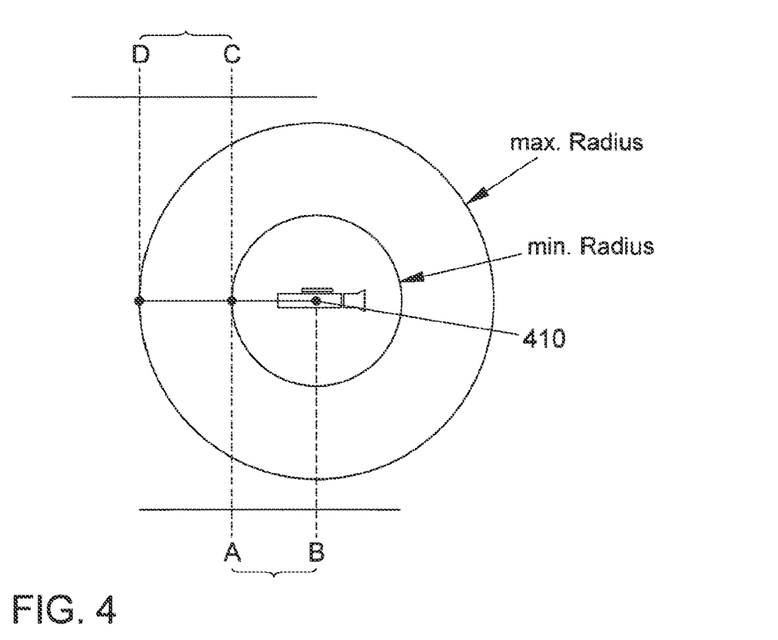
FIG. 4 shows a schematic representation of scaling factors at different distances to the view position.

FIG. 4 shows a schematic representation of an example for the definition of different scaling factors at different distances to a view position 410. In this example, the predefined first distance amounts to 0 and the first scaling factor has the value B. At the location of view position 410, a camera is indicated in order to represent that the navigation map is viewed from this position. At the second predefined distance, which in this example is also called minimum radius (min. radius), the scaling factor has the value A. Between first scaling factor B (or the first distance) and second scaling factor A (or the second distance), interpolation may in turn be carried out. An expanded map-object scaling may be implemented between the second predefined distance and the third predefined distance, which is also denoted as maximum radius (max. radius) in this example. In this context, value A corresponds to value C and represents the second scaling factor. In addition, a third scaling factor may be defined with the value D. Interpolation may again be carried out between the second and third scaling factor. For example, values A and B may be adjustable separately from 1 to 0. Value C, for instance, for the expanded building scaling is linked to value A. Value D may be set arbitrarily with a value from 1 to 0 for the expanded building scaling. However, it may be expedient to select third scaling factor D to be greater than second scaling factor A/C. In the case of the scaling values, 1 denotes the original height, for instance, and 0 the lowest height. For example, FIG. 4 illustrates a functional description of the values min. and max. radius for a distance-based height adjustment.

By way of example, the first scaling factor may be selected to be less than 0.1 (e.g., 0), the second scaling factor between 0.7 and 0.8 and the third scaling factor greater than 0.9 (e.g., 1). Similarly, the scaling factors may also be indicated in percentage or another suitable unit.

By the selection of a predefined max. distance (radius), up to which map objects are to be reduced in their height, it is possible to set to what extent a concealment of map sections by towering map objects is intended to be prevented or reduced. By selecting a large predefined max. distance, the discernibility of needed or desired information may be permitted far in advance, however, the three-dimensional effect of the map is sharply reduced. Conversely, by a small predefined max. distance, the three-dimensional map effect is increased, which means, however, the concealment by map objects is also increased. In other words, processor 120 may reduce the height of towering map objects having a height of more than a predefined height (e.g., anything higher than 1 m or 2 m above street level, in order to keep computing expenditure low), and/or a distance from the view position of less than a predefined max. distance (e.g., within a max. radius). For example, any towering map object having a height of more than the predefined height within a radius having the predefined max. distance about the view position may be reduced in its height. In this manner, a better view, not only directly to the front, but also sideways from the direct direction of view may be permitted, and a similar height profile of towering map objects may be realized all around.

Figure 8:
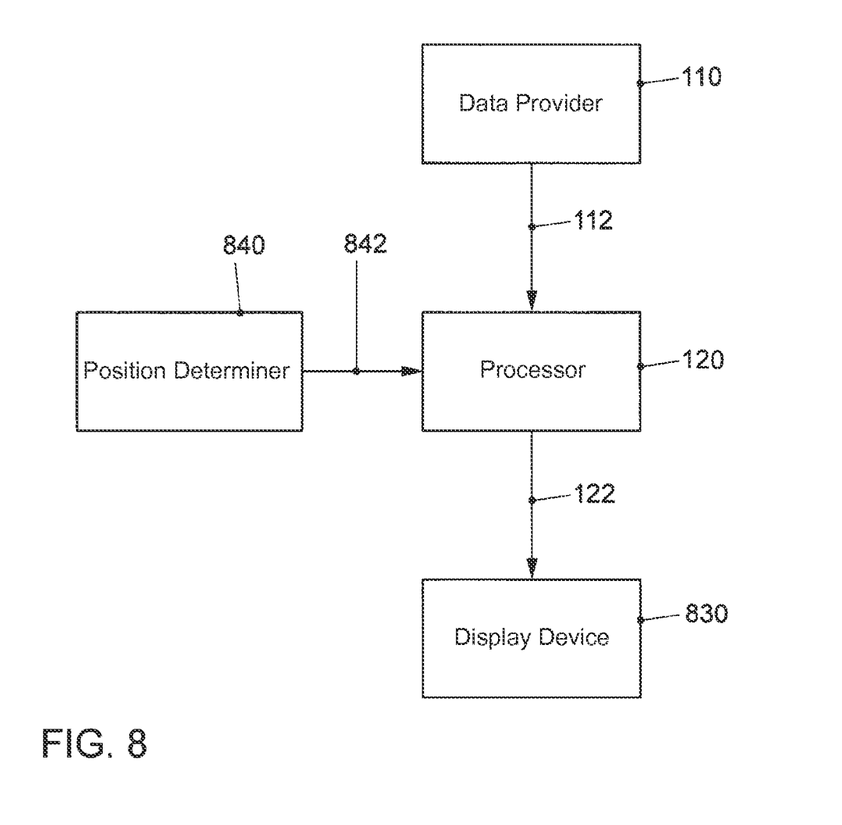
FIG. 8 shows a block diagram of a navigation device for a movable object.

As already mentioned, in several examples, the navigation device optionally has a display device and/or a position determiner (or a localization system). FIG. 8 shows a block diagram of a navigation device 800 corresponding to such an exemplary embodiment. Navigation device 800 has a similar design as the navigation device from FIG. 1. In this respect, the statements previously made supplementally pertain. However, in addition, navigation device 800 has a display device 830, which is connected to processor 120. Navigation device 800 also has a position determiner 840, which is likewise connected to processor 120. Display device 830 (e.g., a screen, a touch screen or a head-up display) is able to reproduce the navigation map on a display area for a user based on display signal 122. Furthermore, position determiner 840 (e.g., GPS system) is able to determine a position 842 of the movable object and provide it to processor 120.

Moreover, navigation device 800 is able to realize one or more optional additional aspects, which correspond to one or more aspects that were mentioned in connection with the concept described and/or an example previously described.

In general, data provider 110, processor 120, display device 830 and/or position determiner 840 or other optional units may be independent hardware units or part of a computer, a digital signal processor or a microcontroller, for example, and may be realized as computer program or software product for execution on a computer, a digital signal processor or a microcontroller. Data provider 110, processor 120, display device 830 and/or position determiner 840 or other optional units may be realized independently of each other, for example, or at least partially together (e.g., on the same chip or by the same computer program).

Exemplary embodiments relate to a vehicle having a permanently installed navigation device according to the concept previously described.

Figure 5:
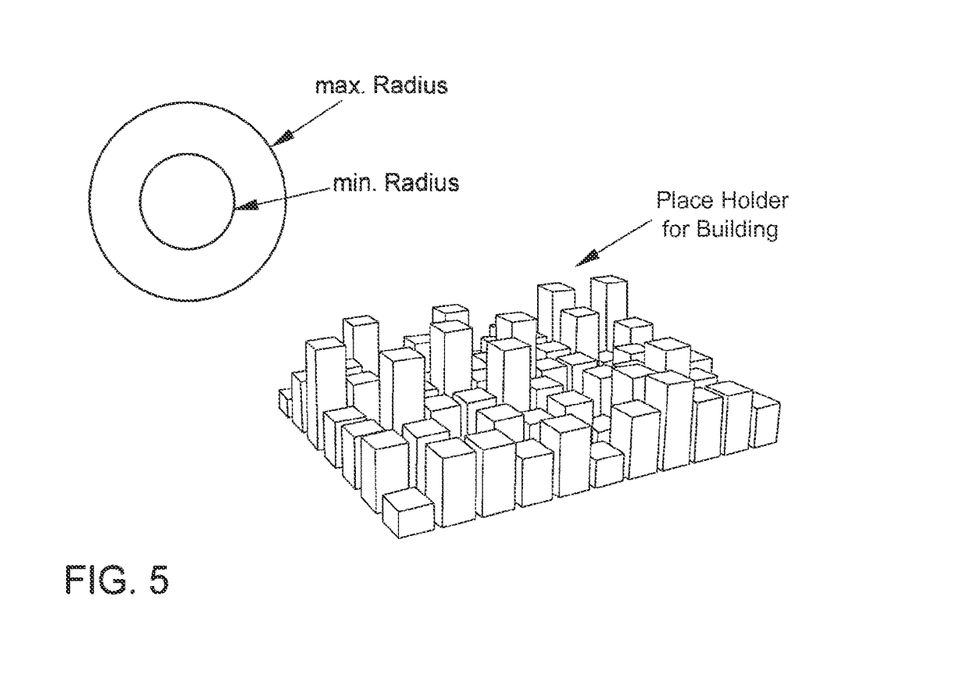
FIG. 5 shows a schematic representation of a navigation map having towering map objects.
Figure 6:
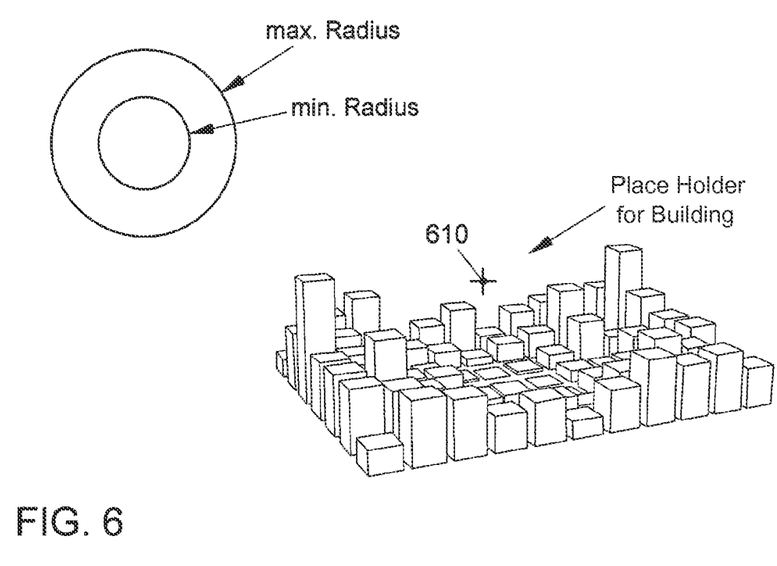
FIG. 6 shows a schematic representation of a navigation map having towering map objects with reduced height in the area of the view position.
Figure 7:
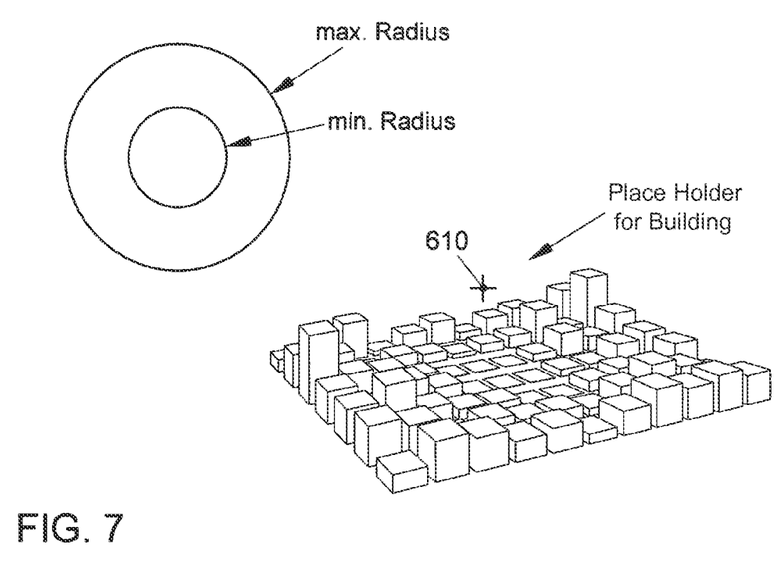
FIG. 7 shows a schematic representation of a navigation map having towering map objects with reduced height in the area of the view position.

FIG. 5 shows an example for a schematic representation of a navigation map having evenly spaced towering map objects with different height. For instance, each of these rectangular towering map objects may be a placeholder for a building or other towering map object. In FIG. 5, the view position is further away than a predefined max. distance or max. radius, from which the height of map objects is reduced. The set extensions of a min. radius and a max. radius (e.g., as was described for FIG. 4) are indicated by the depicted circles. In line with that, FIG. 6 shows an example of a navigation map having towering map objects with reduced height, in which view position 610 is located above the schematically represented navigation map. In this example, map objects directly below view position 610 and in the vicinity of the view position are shown reduced up to a height of 0 (thus are displayed two-dimensionally). The reduction in height decreases corresponding to the setting of the max. radius and the min. radius, thus, the predefined distances and the assigned scaling factors, with distance becoming greater from view position 610. In line with FIG. 6, FIG. 7 shows an example in which the max. radius was enlarged, so that map objects at greater distance are still markedly reduced in their height, as well.

Exemplary embodiments relate to a distance-based height adjustment of buildings. For example, the principle described makes it possible to achieve better readability of a route guidance on a navigation map. In this instance, it is possible to realize a distance-based scaling of the buildings. On the other hand, a distance-based height shift may also be permitted. In order to be able to see the route guidance at a greater distance, the high-rise buildings may be scaled for a prospective routing. This may be accomplished by the distance-based scaling, since because of the nature of the map, the high-rise buildings in particular would lead to a concealment of other map sections.

It is thereby possible to avoid the situation where, for example, in navigation maps displayed from the bird's-eye perspective, the route guidance usually marked in color is concealed by buildings which are too high, and therefore an anticipatory route guidance can no longer, or no longer optimally be ensured. This may be improved by the fact that, for instance, one may scale down the high-rise buildings even to the lowest floor, and thus in general be able to clear the view.

Such a practical application may be used, for instance, within the framework of a map depiction or travel for the automobile (three-dimensional navigational travel).

A distance-based height or scaling may be realized by the concept described. By a distance-based approach of the camera in the streets to the buildings, the view of the route to be traveled may be improved in terms of comprehensibility by altering the surrounding buildings in their height scaling. The height (scaling) of the buildings may be alterable, for example, by two parameters, e.g., as a function of the area and the type of buildings (e.g., high-rise buildings, single-family houses or multi-family buildings). For example, for a city having high-rise buildings, a sharp scaling and a large max radius may be selected. This setting may also be selected automatically, for instance, as a function of the area to be displayed (automatic parameter setting).

The distance-based scaling of the buildings for the camera may function in the case of the approach from all directions (if the camera from above or from the side, as well as from the front and back).

For example, a minimum radius (min. radius) and maximum radius (max. radius) may be defined as parameters. The min. radius may indicate the set distance from which a building is to be scaled small for the camera and with what value the height of the building is to be set (scaled). The max. radius, for instance, may use the height scaling of the buildings outside of the set min. radius.

Figure 9:
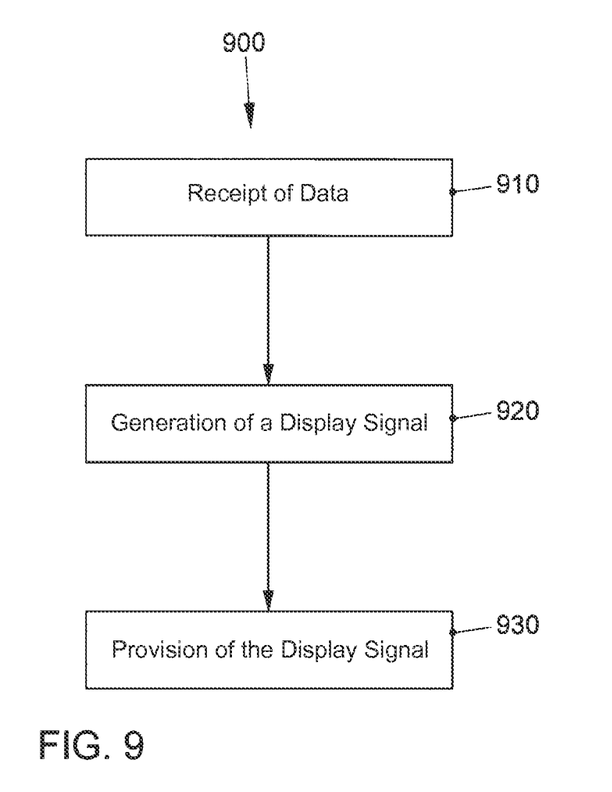
FIG. 9 shows a flowchart of a method for generating a display signal for a navigation device for a movable object.

FIG. 9 shows a flowchart of a method 900 for generating a display signal for a navigation device for a movable object according to an exemplary embodiment. Method 900 includes receipt 910 of data of a three-dimensional navigation map having towering map objects of an area surrounding a movable object based on an ascertained position of the movable object. Method 900 also includes generation 920 of a display signal representing the navigation map, so that the navigation map is viewed from a view position that is located above the navigation map and is a function of the ascertained position of the movable object. In this context, a height of a towering object in the navigation map is altered dynamically as a function of a distance of the towering object to the view position. In addition, method 900 includes provision 930 of the display signal representing the navigation map for a display device for the reproduction of the navigation map.

Method 900 may include further optional, additional or alternative method steps that correspond to optional, additional or alternative developments which were explained in connection with the concept previously described or exemplary embodiments previously described.

The features disclosed in the description above, the following claims and the attached figures may be of importance and implemented both individually and in any combination for the realization of an exemplary embodiment in its various forms.

Although many aspects were described in connection with a device, it should be understood that these aspects also represent a description of the corresponding method, so that a block or a component of a device shall also be understood as a corresponding method step or as a feature of a method step. Analogous to that, aspects which were described in connection with or as a method step also represent a description of a corresponding block or detail or feature of a corresponding device.

Depending on specific implementation requirements, exemplary embodiments of the present invention may be implemented in hardware or in software. The implementation may be realized using a digital storage medium, e.g., a floppy disk, a DVD, a Blu-Ray disk, a CD, a ROM, a PROM, an EPROM, an EEPROM or a FLASH memory, a hard disk or other magnetic or optical memory, on which electronically readable control signals are stored, that are able to interact or do interact with a programmable hardware component in such a way that the respective method is carried out.

A programmable hardware component may be formed by a processor, a computer processor (CPU=Central Processing Unit), a graphics processor (GPU=Graphics Processing Unit), a computer, a computer system, an application-specific integrated circuit (ASIC=Application-Specific Integrated Circuit), an integrated circuit (IC=Integrated Circuit), a single-chip system (SOC=System on Chip), a programmable logic element or a field-programmable gate array having a microprocessor (FPGA=Field Programmable Gate Array), or similar.

The digital storage medium may therefore be machine-readable or computer-readable. Some exemplary embodiments thus include a data carrier that has electronically readable control signals which are capable of interacting with a programmable computer system or a programmable hardware component in such a way that one of the methods described herein is carried out. One exemplary embodiment is thus a data carrier (or a digital storage medium or a non-transitory computer-readable medium), on which the program for carrying out one of the methods described herein is recorded.

In general, exemplary embodiments of the present invention may be implemented as program, firmware, computer program or computer-program product having a program code or as data, the program code or the data being operative to the effect of carrying out one of the methods when the program runs on a processor or a programmable hardware component. The program code or the data may also be stored on a machine-readable carrier or data medium, for example. The program code or the data may be available, inter alia, as source code, machine code or byte code as well as other intermediate code.

In addition, a further exemplary embodiment is a data stream, a signal string or a sequence of signals, which represents or represent the program for carrying out one of the methods described herein. For example, the data stream, the signal string or the sequence of signals may be configured so as to be transferred over a data-communications link, e.g., over the Internet or another network. Exemplary embodiments are thus also signal strings representing data, which are suitable for sending via a network or a data-communications link, the data representing the program.

A program according to one exemplary embodiment is able to implement one of the methods during its execution, e.g., by reading out storage positions or writing a piece of data or a plurality of data into them, which means, if applicable, switching operations or other operations in transistor structures, in amplifier structures, or in other components operating electrically, optically, magnetically or according to another functional principle are evoked. Accordingly, by reading out a storage position, data, values, sensor values or other information may be acquired, determined or measured by a program. Therefore, by reading out one or more storage positions, a program is able to acquire, determine or measure variables, values, measured quantities and other information, and by writing into one or more storage positions, is able to bring about, cause, or carry out an action, as well as control other devices, machines and components.

The exemplary embodiments described above represent only an illustration of the principles of the present invention. Modifications and variations of the systems and particulars described herein will be apparent to other specialists. Therefore, it is intended that the invention be limited only by the scope of protection of the following patent claims, and not by the specific details that were presented herein with the aid of the description and the explanation of the exemplary embodiments.

What is claimed is:

1. A navigation device for a movable object, comprising:
a data provider to provide data of a three-dimensional navigation map having one or more towering map objects; and
a processor to receive data of a three-dimensional navigation map from the data provider, the received data of an area surrounding an ascertained position of a movable object, and to generate a display signal of the three-dimensional navigation map for a display device;
wherein the processor generates the display signal so that the navigation map is displayed as if viewed from a view position that is located above the navigation map and is a function of the ascertained position of the movable object,
wherein the processor dynamically alters a height of at least one towering map object in the navigation map as a function of a distance of the towering map object to the view position, wherein the altered height of the at least one towering map object decreases as the distance of the at least one towering map object to the view position decreases.

2. The navigation device according to claim 1, wherein the processor alters the height of the at least one towering map object by multiplying at least one height parameter of the towering map object by a scaling factor which is a function of the distance of the towering map object to the view position, or by a calculation corresponding to such a multiplication based on at least one scaling factor.

3. The navigation device according to claim 2, wherein the height parameter is received from the data provider.

4. The navigation device according to claim 2, wherein the height parameter is calculated by the processor.

5. The navigation device according to claim 2, wherein the processor alters a height of a first towering map object at a predefined first distance from the view position based on a first scaling factor, and alters a height of a second towering object at a predefined second distance from the view position based on a second scaling factor, and alters a height of a third towering object with a distance, lying between the predefined first distance and the predefined second distance from the view position, based on a scaling factor calculable by an interpolation between the first and the second scaling factor.

6. The navigation device according to claim 5, wherein the processor alters a height of a fourth towering map object at a predefined third distance from the view position based on a third scaling factor, and alters a height of a fifth towering object with a distance, lying between the predefined second distance and the predefined third distance from the view position, based on a scaling factor calculable by an interpolation between the second and the third scaling factor.

7. The navigation device according to claim 6, wherein the first scaling factor is less than 0.1, the second scaling factor lies between 0.7 and 0.8, and the third scaling factor is greater than 0.9.

8. The navigation device according to claim 5, wherein the processor uses different types of interpolation as a function of a user setting or as a function of a nature of the navigation map to be reproduced.

9. The navigation device according to claim 5, wherein the processor calculates an interpolated scaling factor by a linear interpolation between the first and the second scaling factor.

10. The navigation device according to claim 5, wherein the processor calculates an interpolated scaling factor by a tangential interpolation between the first and the second scaling factor, the tangential interpolation having a continuously differentiable characteristic.

11. The navigation device according to claim 1, wherein the processor reduces a height of a first towering map object at a first distance from the view position more sharply than a height of a second towering object at a second distance from the view position, the first distance being smaller than the second distance.

12. The navigation device according to claim 1, wherein the processor generates the display signal so that the display device is able to reproduce the at least one towering map object in a manner scaled according to the change in its height in the vertical direction.

13. The navigation device according to claim 1, wherein the processor generates the display signal so that the display device is able to reproduce the at least one towering map object in a manner shifted at least partially into the ground compared to parts of the navigation map adjacent to the towering map object.

14. The navigation device according to claim 1, wherein the processor reduces the height of at least one towering map object having a height of more than a predefined height and a distance from the view position of less than a predefined maximum distance.

15. The navigation device according to claim 1 wherein the navigation device is permanently installed in a vehicle.

16. A method for generating a display signal for a navigation device for a movable object, the method comprising:
receiving data corresponding to a three-dimensional navigation map having at least one towering map object of an area surrounding a movable object based on an ascertained position of the movable object; and generating a display signal representing the navigation map, so that the navigation map is viewed from a view position that is located above the navigation map and is a function of the ascertained position of the movable object, and a height of at least one towering object in the navigation map is altered dynamically as a function of a distance of the towering object to the view position, wherein the altered height of the at least one towering map object decreases as the distance of the at least one towering map object to the view position decreases; and transmitting the display signal representing the navigation map to a display device for display of the navigation map.

17. A non-transitory computer readable medium including instructions which when executed on a programmable processor, induce the processor to carry out the steps of a method, the method comprising:

receiving data corresponding to a three-dimensional navigation map having at least one towering map object of an area surrounding a movable object based on an ascertained position of the movable object; and generating a display signal representing the navigation map, so that the navigation map is viewed from a view position that is located above the navigation map and is a function of the ascertained position of the movable object, and a height of at least one towering object in the navigation map is altered dynamically as a function of a distance of the towering object to the view position, wherein the altered height of the at least one towering map object decreases as the distance of the at least one towering map object to the view position decreases; and transmitting the display signal representing the navigation map to a display device for display of the navigation map.

* * * * *